Oct. 18, 1960

J. E. MAY, JR 2,957,142

ULTRASONIC DELAY LINE

Filed July 20, 1956

INVENTOR
J. E. MAY, JR.
BY
*H. O. Wright*
ATTORNEY

Oct. 18, 1960 J. E. MAY, JR 2,957,142
ULTRASONIC DELAY LINE
Filed July 20, 1956 5 Sheets-Sheet 3
FIG. 6 FIG. 5
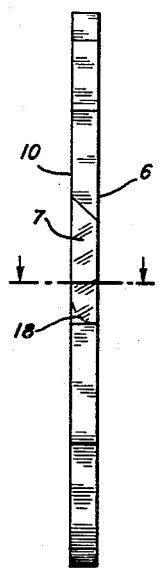
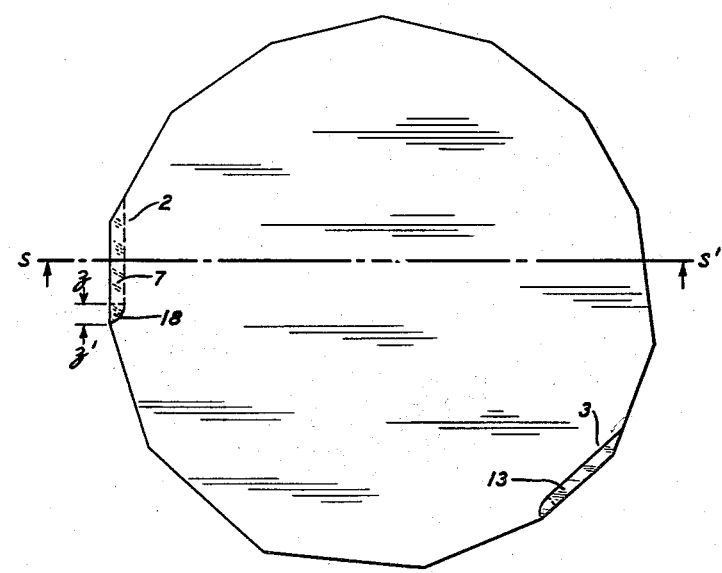
FIG. 7
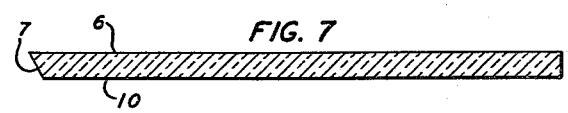
FIG. 8
FIG. 9
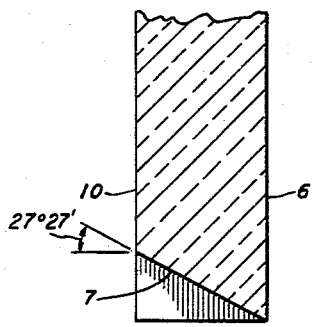
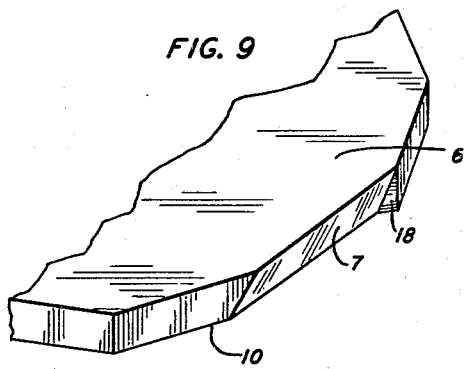
INVENTOR
J. E. MAY, JR.
BY
H. O. Wright
ATTORNEY Oct. 18, 1960

J. E. MAY, JR 2,957,142

ULTRASONIC DELAY LINE

Filed July 20, 1956

INVENTOR
J. E. MAY, JR.
BY
H. O. Wright
ATTORNEY

Oct. 18, 1960

J. E. MAY, JR 2,957,142

ULTRASONIC DELAY LINE

Filed July 20. 1956

INVENTOR
J. E. MAY, JR.
BY
H. O. Wright
ATTORNEY

United States Patent Office 2,957,142
Patented Oct. 18, 1960

2,957,142

ULTRASONIC DELAY LINE

John E. May, Jr., Whippany, N.J., assignor to Bell Telephone Laboratories, Incorporated, New York, N.Y., a corporation of New York Filed July 20, 1956, Ser. No. 599,236

11 Claims. (Cl. 333—30)

This invention relates to acoustic delay devices and more particularly to solid ultrasonic delay lines.

In order to impose a prescribed delay on an ultrasonic beam traversing a solid medium, it is often necessary to provide an extended path for the beam. For compactness of the medium, this path is folded into a limited space by multiple internal reflections of the beam in the medium. Structures geometrically designed to provide such multiple internal reflections of the transmitted beam are known as "multi-facet" delay lines.

Solid delay lines, particularly of the aforesaid type, have assumed increasing importance in view of their prospective application to telephone and other types of systems employing storage devices. However, in order to render solid delay lines commercially practical for such applications, it is expedient to reduce their relatively high transmission losses, a large fraction of which are believed to be due to the transducers used in combination with the delay element.

Since barium titanate has a high coupling coefficient compared to quartz, a considerable reduction in transmission loss has been effected by the use of barium titanate transducers in combination with solid delay lines. However, barium titanate transducers have been found to be practical only for the generation of waves in the longitudinal mode. Hence, when a barium titanate transducer is connected to a system specially designed to accommodate shear-mode vibrations, it must be combined with mode-converting means to transform the generated longitudinal mode beam into a beam vibrating in the transverse or shear mode.

A suitable mode-converting element frequently takes the form of a prismatic block having one surface in contact with a surface of the transducer, a second surface disposed to deflect the acoustic wave beam through a critical mode-converting angle, and a third surface in contact with the input or output facet of the solid delay line. Hence, a beam of longitudinal mode waves generated by the transmitting transducer is completely reflected as a beam of shear waves by a first mode converter and directed to the input facet of the delay line. Likewise, the beam of shear-mode waves which has traversed the delay line is completely reflected as a beam of longitudinal waves and directed to the receiving transducer by a second mode converter. The principle of mode conversion was first disclosed by D. L. Arenberg in "The Journal of the Acoustical Society of America," volume 20, No. 1, January 1948, pages 7 and 8. The technique of applying mode conversion to delay lines in which the reflection pattern for each ray lies in a plane was disclosed by H. J. McSkimin in his patent application Serial No. 331,299, filed January 14, 1953, which is now Patent No. 2,839,731, issued June 17, 1958.

Although substantially improved results have been noted in solid delay lines in which a beam of shear waves is propagated by barium titanate transducers in combination with mode converters, in the manner of McSkimin, it was further observed by the present inventor that when both mode-converting elements applied to the transmitting and receiving facets were disposed so that the output beam is reflected to the same side of the plane of the reflection pattern as the input beam, the band-pass characteristic of the overall delay line including the mode converters was not smooth, but exhibited a series of peaks and valleys. From this it appeared that the various parts of the beam were traversing slightly different path-lengths in the delay medium, resulting in alternate phase cancellation or addition within the pulse time, depending on the pulse carrier frequency. This theory was supported by the fact that the peaks and valleys of the band-pass curve were less marked when using a short pulse than when using a long pulse.

Accordingly, it is the general object of the present invention to improve transmission characteristics in acoustical delay devices employing mode-converting elements. A more particular object of the invention is to reduce irregularities within the pass band of such devices so that the usable pass bands which they provide are comparable with delay lines having similar parameters but not employing mode conversion.

In accordance with the present invention, these and other objects are realized by inverting the position of the receiving transducer and its associated mode converter with respect to the transmitting transducer and its associated mode converter, relative to the plane of shear-wave reflections in the delay line to which they are attached. A further feature of the invention involves grinding the mode-converting elements integrally with the solid delay line, in each case cutting the facet of the mode converter to which the transducer is to be attached at an internal angle with respect to the adjacent major surface of the delay line. This integral construction, of course, eliminates the necessity of joining the other facet of the mode converter to the facet of the delay line and likewise eliminates the energy reflection usually encountered where such a junction must be made when using mode converters which are initially separate from the delay line.

The inverted arrangement of the mode converters has the advantage of equalizing the path-lengths traversed in the overall delay line by different rays of the beam, thereby substantially broadening the pass-band of the delay line and reducing irregularities therein. In addition, an integral, compact delay unit is provided, in which spurious reflections are reduced to a minimum.

Additional objects, features, and advantages of the present invention will be apparent from a study of the detailed description hereinafter, and the attached drawings, in which:

Figs. 5 and 6 show in plan view and end-elevation, respectively, a multi-facet delay line after the initial step of grinding the beveled reflecting surfaces of a pair of mode converters at the transmitting and receiving facets, in accordance with the present invention;

Fig. 7 shows a cross section of the structure of Fig. 5 through the line indicated;

Fig. 8 shows in enlarged cross section the beveled edge along the line indicated in Fig. 6;

Fig. 9 shows in enlarged perspective a portion of the structure indicated in Figs. 5, 6, 7, and 8, including the beveled edge surface, after completion of the initial grinding operation;

Figure 15:
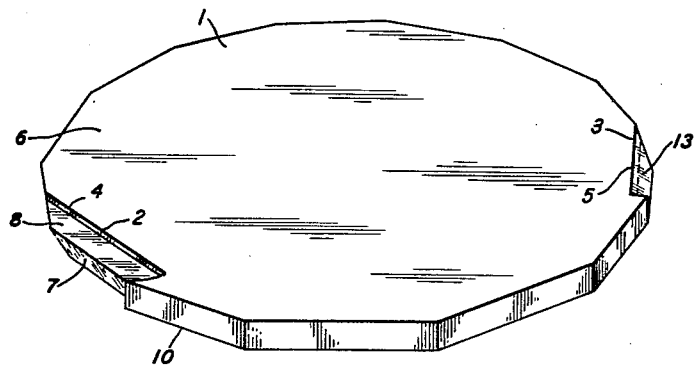
Figure 16:
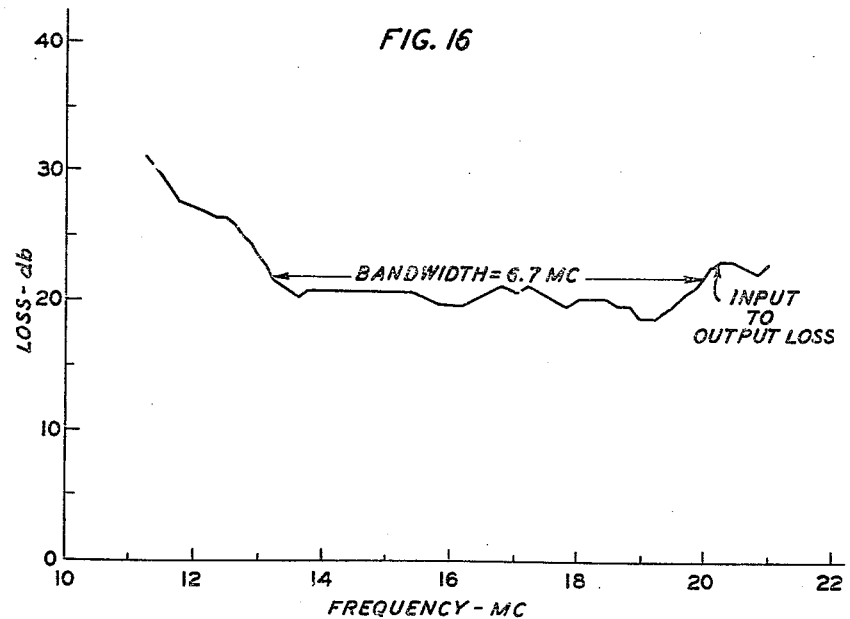

Fig. 15 shows in perspective a complete multi-facet delay line structure including a pair of mode converters, ground as indicated in the previous figures, and disposed in inverted relation, in accordance with the present invention; and Fig. 16 is a graph of voltage loss in decibels plotted against frequency in megacycles, for an ultrasonic delay line of integral construction employing a pair of mode converters in inverted relation, as taught in accordance with the present invention.

By way of illustrative example, the mode-conversion technique of the present invention will be described with reference to a multi-facet delay line such as disclosed by D. L. Arenberg, "Ultrasonic Delay Lines," Convention Record I.R.E., 1954, Part 6, Fig. 13, page 70. However, it will be understood by those skilled in the art that the present invention can be applied equally well to solid delay lines of other designs having reflection patterns confined to a plane such as, for example, wedge-shaped delay lines of the types disclosed by H. J. McSkimin patent, supra.

Figure 1:
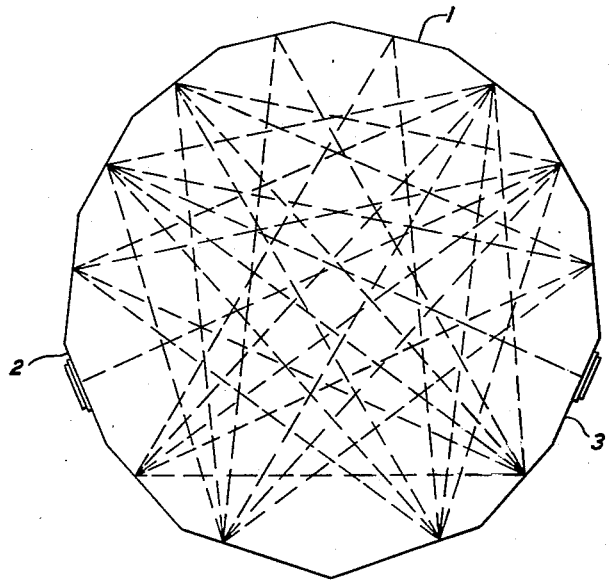
Fig. 1 is a plan view of a prior art multi-facet delay line, indicating a pattern of multiple reflections in a plane.

Referring in detail to the drawings, Fig. 1 shows in plan view a multi-facet delay line 1 of the type disclosed by Arenberg, which comprises a disk-like modified polygon about 5/16" thick, of fused quartz, having two flat, parallel major surfaces. For the purpose of the present illustrative embodiment, there are fourteen symmetrical edge facets, all of which are perpendicular to the parallel planes of the major surfaces, with the exception of the transmitting and receiving facets at 2 and 3, modifications of which, in accordance with the present invention, will be described in detail hereinafter. Assuming that it is desired to impress a delay of 1000 microseconds on an ultrasonic beam, the polygon 1 of Fig. 1 should have diametrical axes of symmetry which measure about 6".

The ultrasonic beam is propagated in a direction perpendicular to transmitting facet 2 parallel to the major surfaces of delay device 1, and executes the complex path configuration indicated, including 30 reflections, which terminates in a beam perpendicular to the receiving facet 3. It can be seen that if mode conversion were to take place at each reflection in the complex pattern of Fig. 1, much of the energy of the ultrasonic beam would be dissipated. Hence, to avoid such dissipation of energy, the beam traversing the delay element must be propagated in shear mode, and so oriented that the vibrations are perpendicular to the plane of incidence at each reflection, and parallel to the reflecting facets on which the beam impinges, so that no mode conversion takes place in reflections from the facets. Accordingly, utilizing a shear-mode beam propagated in the manner indicated, a total path-length of 148 inches is folded into the working plane of the polygon delay line 1 between the transmitting and receiving facets 2 and 3 respectively. In prior art structures, such a wave was customarily generated by properly oriented Y-cut or shear-mode vibrating quartz crystals applied to perpendicular facets at the transmitting and receiving positions 2 and 3.

It is contemplated, in accordance with the present invention, to replace the high-loss Y-cut quartz crystals commonly used to generate shear wave vibrations in delay lines of the multi-facet type described, with generators having much higher coupling coefficients, thereby permitting the construction of lower-loss delay lines. A number of ceramic transducer compositions are included in this category, such as those comprising a major crystalline component of, for example, barium titanate, potassium sodium niobate, or lead zirconate. In transducers comprising the ceramics mentioned, and in other ceramic materials which can be used as low-loss generators, it is inconvenient to generate transverse or shear waves because of the fact that the transducer must be initially polarized in a direction perpendicular to the direction in which the driving potential is applied. Since it is technically difficult to apply electrodes for application of the driving potential to the ceramic wafers usually employed after they have been polarized, transducers comprising such ceramic crystalline materials are in general polarized in the thickness direction, the same direction in which the driving potential is ultimately applied to the transducer. Transducers of this type are thus driven to vibrate in a longitudinal-thickness mode of vibration. Hence, a problem arises in converting the longitudinal vibrations generated by the transmitting transducer to shear-mode vibrations of the proper orientation at the transmitting facet of the delay line, and in the inverse conversion process at the receiving facet.

In general, when an acoustic-energy wave vibrating in a longitudinal (or shear) mode is reflected at a solid-air boundary, there results, not only the reflected longitudinal (or shear) mode vibration propagated at an angle with the normal to the reflecting surface which is equal to the angle of incidence, but in addition, there results a shear (or longitudinal) mode vibration at some other angle.

There is one or two critical angles of incidence at which the incident longitudinal (or shear) wave is completely converted to a reflected shear (or longitudinal) wave, depending on whether the medium has a Poisson ratio greater or less than 0.26 respectively.

The mathematical relationships between an acoustic wave in one mode (for example, longitudinal) incident on an air-solid interface, and the reflected waves, in the same mode (longitudinal) and in a different mode (shear), have been worked out in detail by D. L. Arenberg on pages 7 and 8, "The Journal of the Acoustical Society of America," vol. 20, No. 1, January 1948.

On page 8, in Equations 19 and 20 and in the preceding paragraph, he sets up the conditions under which, for a longitudinal wave incident at angle $\alpha$, the reflected longitudinal wave component is zero, and only a shear wave component is reflected at angle $\beta$.

Figure 2:
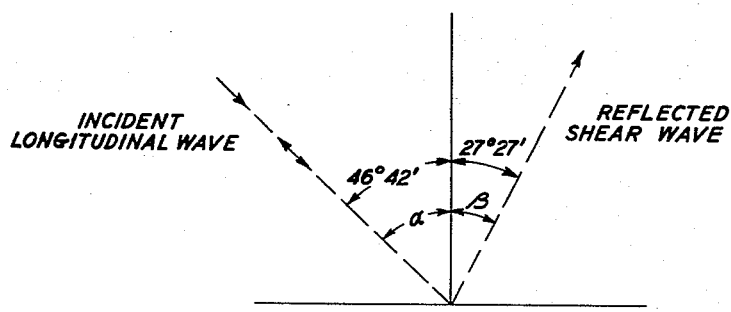
Fig. 2 is a diagram illustrating certain theoretical considerations in connection with the invention.

Referring to Fig. 2 of the drawings, $\alpha$ represents the angle of the incident longitudinal wave with the normal, and $\beta$ represents the angle of the reflected shear wave. Assume that $$a = \cot \alpha \quad (1)$$

and $$b = \cot \beta \quad (2)$$

Values for $a$ and $b$ can be determined as follows, using Arenberg's equations. The corrected form of Equation 20, page 8 of Arenberg's article is:

$$a^8(\xi+1)^4 + 4a^6\xi(\xi+1)^3 + a^4(\xi+1)(6\xi^3+6\xi^2-2) \quad (3)$$
$$+ a^2(4\xi^4+4\xi-2\xi-1) + \xi^4 = 0$$

where $$\xi = \frac{\sigma}{1-2\sigma} \quad (4)$$

The value $\delta$, Poisson's ratio, may be computed from the following relationship:

$$\sigma = \frac{1-2\left(\frac{V_s}{V_L}\right)^2}{2\left[1-\left(\frac{V_s}{V_L}\right)^2\right]} \quad (5)$$

where:
$V_s$=velocity of shear wave in solid medium
$V_L$=velocity of longitudinal waves in solid medium From page 7 of Arenberg's article:

$$b^2 = a^2(2\xi+2)+2\xi+1 \quad (6)$$

Thus, both $\alpha$ and $\beta$ may be determined from above, using the inverse trigonometric relationships $$\underline{/\alpha} = \cot^{-1} a \quad (7)$$

and $$\underline{/\beta} = \cot^{-1} b \quad (8)$$

For the purpose of the embodiment under description, the values of $\alpha$ and $\beta$ are utilized which are set forth on page 19 of Arenberg's article, supra, in which:

$$\alpha = 46.70° = 46° \ 42' \quad (9)$$

and $$\beta = 27.45° = 27° \ 27' \quad (10)$$

These values were computed on the basis of a value 0.162 for Poisson's ratio ($\delta$) for fused quartz. While this value of Poisson's ratio is sufficiently accurate that reasonably good results can be obtained by using it, measurements now being made indicate that it may be possible to determine this ratio to a somewhat greater degree of accuracy. It will be apparent to those skilled in the art that a more accurate determination of Poisson's ratio will in turn give more accurate determinations of the angles $\alpha$ and $\beta$. The principles of the present invention will, of course, be equally applicable in precisely the manner indicated in this application when Poisson's ratio has been more accurately determined.

In order to deflect the transmitted acoustic-wave beam through the critical angle necessary to bring about the desired mode conversion, it is necessary, as discussed in detail above, to interpose a solid mode-converting element of critical shape between the transducer, assuming a transducer which vibrates in a longitudinal-thickness direction, and the input facet of the delay line, since it is desired to generate a shear-wave ultrasonic beam in the delay line. This mode-converting element may take the form of a block of strain-free, optical-grade fused-silica, prismatic in form, which is shaped to interpose the desired angular relationship between the generated beam and the beam passing into the delay line in a plane parallel to the major surface planes thereof. Details of such an arrangement are further disclosed by the McSkimin patent, supra.

It has been observed by the present inventor, as pointed out previously, that in the mode-converting arrangement of the prior art wherein both the transmitting and the receiving transducers and their associated facets of the mode-converting elements are on the same side of the working plane of the delay line, the band-pass curve of the line is marked by a series of peaks and valleys. This finding indicated to the present inventor that various parts of the beam traversed slightly different path-lengths, as a result of the orientation of the mode-converters, so that alternate phase addition or cancellation took place within the pulse time, depending upon the pulse carrier frequency. This theory is supported by the fact that the peaks and valleys of the band-pass curve were less marked when using short pulses than when using longer pulses.

Figure 3:
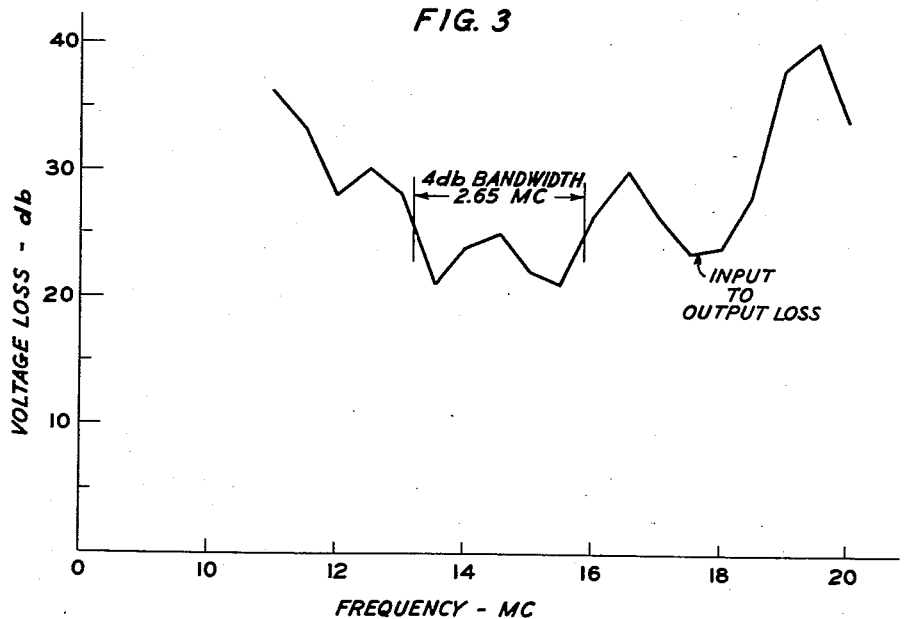
Fig. 3 is a graph of voltage loss in decibels plotted against frequency in megacycles for an ultrasonic delay line employing mode converters in the manner taught in the prior art.

A band-pass curve typical of the prior art structure just described, is indicated in Fig. 3 of the drawings, which shows loss in decibels plotted against frequency in megacycles. The curve of Fig. 3 is seen to include only a relatively narrow bandwidth of 2.65 megacycles within which the attenuation is uniform to within about 4 decibels. Moreover, even within this narrow band there are sharp variations.

In accordance with the present invention, a structure is provided in which the various parts of the beam travel equal path-lengths between the transmitting and receiving transducers. This is made possible by inverting one mode converter and its associated transducer with respect to the other in the manner indicated, for example, in Fig. 4 of the drawings, which shows in cross section, fragmentary portions adjacent the transmitting and receiving transducers of a multi-facet delay line such as that indicated in Fig. 1 but having mode converters cut as integral portions of the line as shown, for example, in Fig. 15, described hereinafter.

Figure 4:
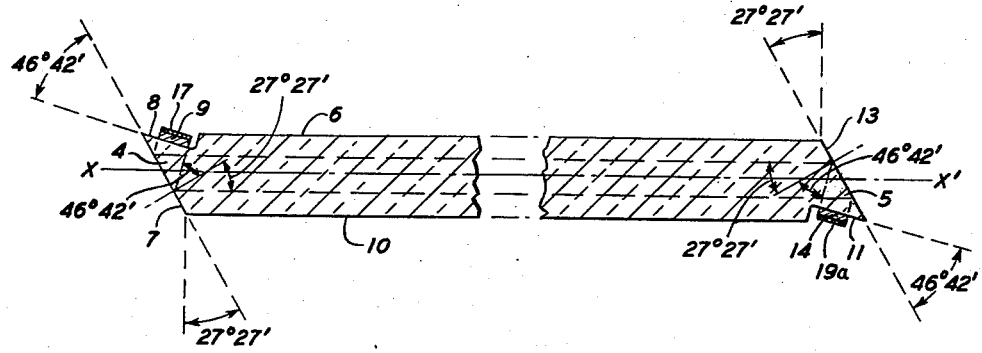
Fig. 4 is a fragmentary cross-sectional view of a delay line including a pair of mode converters attached in inverted relation, in accordance with the present invention.

In accordance with the showing of Fig. 4, the transmitting facets 2 and 3 of Fig. 1 are ground so as to include integrally therewith a pair of mode-converting portions 4 and 5, which are inversely related with respect to a major plane of symmetry $xx'$, through the center of the multi-facet delay line 1. As indicated in Fig. 4, the lip-surface 8 of the mode-converting portion 4, to which is attached an electroacoustic longitudinal-thickness mode generator 9, is slightly recessed at its internal boundary with respect to the major surface 6 of delay line 1. Lip-surface 8 makes an acuate angle 46 degrees and 42 minutes with the external beveled edge surface 7, which, in turn, forms an angle 27 degrees and 27 minutes with the normal to the lower major surface 10 of the delay line 1.

Accordingly, a beam vibrating in a longitudinal mode propagated perpendicular to lip-surface 8 impinges on the beveled edge-surface 7, making an angle of incidence of 46 degrees 42 minutes with the normal thereto, causing the reflected beam parallel to plane $xx'$ to be substantially entirely converted to a shear-wave beam making an angle 27 degrees 27 minutes with the same normal. At the receiving facet, lip-surface 11, slightly recessed at its inner boundary with respect to major delay line surface 10, makes an acute angle of 46 degrees 42 minutes with beveled edge-surface 13. The latter makes an angle 27 degrees 27 minutes with the normal to major delay line surface 6.

Hence, mode-converting portions 4 and 5 have a reversed symmetry with respect to each other about the plane $xx'$. Accordingly, a shear-wave beam having a direction of propagation parallel to plane $xx'$, impinges internally on edge-surface 13 at an angle 27 degrees 27 minutes with the normal thereto, and is completely reconverted to a longitudinal-wave beam which is reflected at an angle 46 degrees 42 minutes with the same normal. Hence, the reconverted longitudinal beam is perpendicular to the longitudinally-vibrating transducer element 14.

In order to more clearly set forth the exact form of construction of the mode-converting portions 4 and 5 in integral relation with the delay line 1 at the transmitting and receiving facets 2 and 3 thereof, two groups of detailed structural drawings, Figs. 5, 6, 7, 8, and 9, and Figs. 10, 11, 12, 13, and 14, have been included to show in plan view, side elevation and overall cross section, enlarged partial cross section, and perspective, a preliminary and a final step, respectively, in grinding the said elements to the specified shapes.

In the course of the first step, the transmitting facet 2 and the receiving facet 3 indicated on Fig. 1 are beveled to form the reflecting edge-surfaces 7 and 13, respectively, as indicated on the fragmental cross-sectional drawing, Fig. 4. It will be apparent that if the surfaces 7 and 13 are assumed to be directly opposite each other as shown in Fig. 4, they are ground parallel to each other, making respective angles of 27 degrees and 27 minutes with the normal to major surfaces 6 and 10.

The plan view of Fig. 5 shows the major surface 6 of the multi-facet delay line 1, the projection of the beveled edge-surface 7 being indicated by a shaded area.

In like manner, the shaded portion 7 of Fig. 6 indicates the projection of beveled edge-surface 7 on a thickness plane perpendicular to the major surfaces 6 and 10.

Fig. 7 is an overall cross-sectional view taken along line S—S' looking in the direction of the arrows of Fig. 5, showing the pitch of beveled surface 7. This is shown in more detail in the enlarged cross-sectional view of Fig. 8, looking along the dash-dot line in the direction indicated by the arrows on Fig. 6.

Beveled surface 7 is ground to make an angle 27 degrees 27 minutes with the normal to surface 10, as indicated in Figs. 4 and 8.

The angles to be ground can be determined accurately by using a dividing-head, or sine-bar, or by any of the other means well known in the art. For extremely accurate determinations, the angular orientations of the surfaces may be checked by focusing a beam from an auto-collimator on the ground surface, and measuring the angular deviation of the reflected beam.

Beveled surface 7 is ground flat, as indicated on Figs. 5, 6, 7, 8 and 9, except for area 18, at one end, wherein ¼ inch or less tolerance is allowed in the space included between lines Z—Z' to accommodate the grinding wheel after it has passed over the flat portion. It will be apparent to those skilled in the art that for proper operation in an area such as 18, the grinding wheel should have a radius sufficiently small to permit the dimensions of the area 18 to fall within the desired tolerance. By terminating beveled surface 7 in area 18, any interference with the adjacent facet is avoided.

The crystal surfaces may, for example, be ground initially with a 250 to 300 grit metal-bonded cutting wheel, the final polish being applied with a 500-grit phenolic wheel. During the grinding operation, the surfaces under treatment are wetted, in a manner well known in the art, with a chemical emulsion, water-based grinding solution.

It will be apparent that in accordance with the present invention, the initial grinding operation at the receiving facet 3 shown in Fig. 5 is exactly the same as that above-described at transmitting facet 2, except for the fact that the polygon delay line 1 is turned top-to-bottom and right-to-left so that the major surface 10 is uppermost and disposed in a position identical with that of major surface 6, as in the prior description regarding Figs. 4, 5, 6, 7, 8 and 9. Thus, the beveled surface 13 will be so ground that it bears exactly the same relationship to major surface 10 as the beveled surface 7 bears to major surface 6, as further illustrated in Fig. 4. Otherwise it will be apparent that the structure of the receiving facet 3 is identical with that of the transmitting facet 2.

Figure 11:
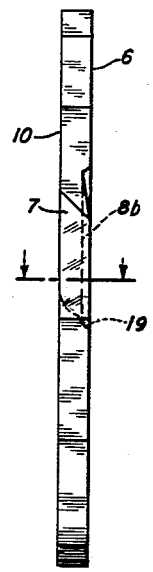
Figs. 10 and 11 show in plan view and end-elevation, respectively, a multi-facet delay line after the final step of grinding a pair of mode converters integrally with the transmitting and receiving facets, in accordance with the present invention.
Figure 10:
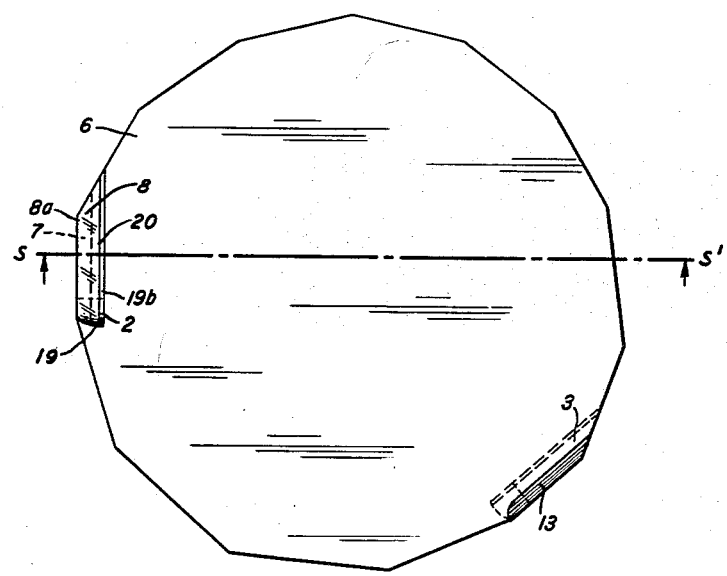
Figure 12:
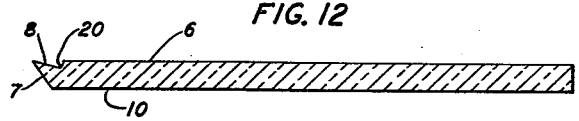
Fig. 12 shows a cross-sectional view of the structure of Fig. 10 through the line indicated.
Figure 13:
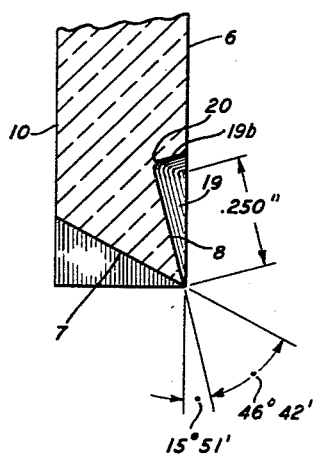
Fig. 13 shows a portion in enlarged cross section of the structure indicated by the arrows on Fig. 11.

Figs. 10, 11, 12, 13, and 14 indicate further modification of the transmitting and receiving facets 2 and 3 from the preliminary form indicated by Figs. 5, 6, 7, 8, and 9. Assuming the major surface 6 of the delay line 1 to be uppermost at transmitting facet 2 as previously explained in regard to Fig. 5, lip-surface 8 is ground, as indicated in cross-sectional showing of Figs. 4, 10 and 12, so that it makes an acute internal angle of 46 degrees and 42 minutes with the beveled surface 7, as illustrated in Figs. 4 and 13. The shaded areas 8a and 8b of Figs. 10 and 11 indicate, respectively, projections of the internally-tilted lip-surface 8 on the major surface 6, and on the plane perpendicular thereto. Cross-sectional view shown in Fig. 12 looking in the direction of the arrows on line S—S' in Fig. 10, and enlarged cross-sectional view shown in Fig. 13 looking in the direction indicated by arrows on the dash-dot line in Fig. 11 show the form and width-dimension of the lip-surface 8 and its relationship to the adjacent surface 7. Reference numeral 20 represents the bounding inner edge of lip-surface 8 which is recessed slightly with respect to the major surface 6.

Figure 14:
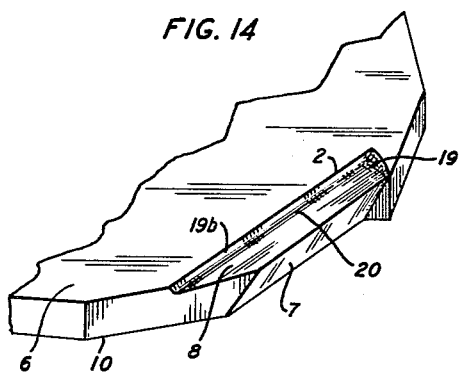
Fig. 14 shows in enlarged perspective a portion of a mode converter structure, in accordance with the present invention, after the final grinding operation.

As indicated by the dimensions on the enlarged section shown in Fig. 13, the lip-surface 8 extends inwardly .250 inch from the upper outer edge of beveled surface 7 to bounding inner edge 20, is ground flat, and polished with a 500 grit finish in the manner previously described. The design allows for additional areas of curved contour having a good finish, which are indicated by shaded portions 19b and 19 shown in Figs. 10, 11, 13 and 14. The curved areas indicated are sufficiently dimensioned to clear the edge of the guiding wheel, during an operation in which the latter is reversed or removed. Fig. 14 shows the transmitting facet 2 after the completion of the grinding operation.

The lip-surface 11 shown in Fig. 4 is ground to make an angle of 46 degrees 42 minutes with beveled surface 13 forming the receiving facet 3 shown in Figs. 5 and 10 in exactly the same angular relationship as lip-surface 8 bears to beveled surface 7 included in the transmitting facet 2 described above in regard to Figs. 4, 5, 10 and 14, assuming that the delay line 1 is turned top-to-bottom and right-to-left so that major surface 10 is uppermost and disposed in a position identical with that of major surface 6 shown in Figs. 4, 10, 11, 12, 13 and 14. Otherwise, it will be apparent that the structure of the receiving facet 3 is identical with that of the transmitting facet 2.

Fig. 15 is a perspective showing of the delay line 1 including mode-converting portions 4 and 5, more clearly shown in Fig. 4, formed by the transmitting and receiving facets 2 and 3, respectively, in the manner indicated with reference to the figures previously described.

Assuming that the mode-converting portions 4 and 5 have been ground in integral relation with the delay element 1, and in inverse angular relation about the plane $xx'$, as indicated in the previous figures, electroacoustic transducing elements 9 and 14 are then applied to the respective lip-surfaces 8 and 11.

The purpose of the arrangement of the present invention, of course, is to accommodate transducing elements vibrating in a longitudinal-thickness mode. Accordingly, as previously pointed out, any transducers in this category are suitable for the purposes of the present invention. By way of specific example, the transducing elements 9 and 14 of Fig. 4 may comprise a ceramic material including 80 percent $BaTiO_3$, 12 percent $PbTiO_3$ and 8 percent $CaTiO_3$, mixed with binder materials, and processed in the manner described in detail in W. P. Mason application Serial No. 351,843, filed April 29, 1953, now Patent No. 2,906,973. From such a material is formed a pair of thin rectangular wafers ¾ inch long by ¼ inch wide by 6.4 mils thick, to the major surface of which are applied fired silver electrodes, the under sides being completely coated. These are respectively applied in a manner well known in the art to silver coated areas on the lip-surfaces 8 and 11 of delay element 1, by means of thin layers of lead-tin-bismuth eutectic solder.

The electrodes 17 and 19a applied to the outer surfaces of transducers 9 and 14 may take any of the forms well known in the art. For example, to reduce the capacitance of the respective transducer, a single electrode strip ⅟₁₆ inch wide may be applied to the outer surface of each of the tranducers 9 and 14, so disposed that it is symmetrical with and parallel to the long edges of the transducer. The fired silver electrode coatings used on the transducers 9 and 14 and the delay line facets 8 and 11 may consist, for example, of a layer of silver paste, having a thickness of about 20 milligrams per square inch, which is sprayed on and fired at 725° centigrade.

The transducers are prepolarized, in a manner well known in the art, by applying in the thickness direction of the element a voltage of about 30 volts per mil thickness of the transducer element, while the transducer is allowed to cool slowly from a temperature above its Curie temperature to room temperature.

Fig. 16 is a graphical showing of voltage loss in decibels plotted against frequency in megacycles, for a delay line employing the inverted mode converter arrangement of the present invention. A comparison of Fig. 16 relating to arrangement of the present invention, with Fig. 3, which is a similar showing of the performance of a prior art arrangement with both pairs of transducers and mode converters on the same side of plane xx', shows an increase of more than 150 percent between the arrangement of the present invention and the prior arrangement, in the usable pass band over which the loss varies less than 4 decibels. Moreover, it is seen from Fig. 3 that the midband loss in the prior art arrangement is much more subject to fluctuation even over the narrower pass band.

It will be understood that, although a particular embodiment of the invention has been described in detail by way of illustrative example, the invention as herein set forth, and as defined in the appended claims, is not limited to structures of the specific form and dimensions indicated.

What is claimed is:

1. In combination, a solid acoustic delay line of a folded path type comprising a slab of a solid elastic material having substantially flat and parallel top and bottom major faces; an input generator of a beam of longitudinal acoustic waves; a first mode converting surface disposed at a critical angle formed with a plane normal to one of said faces to convert said beam of longitudinal waves into a beam of shear waves polarized perpendicular to a working plane parallel to and lying symmetrically between said faces; reflecting side surfaces included in said slab and disposed normally to said faces in parallel to the direction of polarization of said beam whereby said beam of shear waves is contained within said slab by multiple reflections without mode conversion; a second mode converting surface disposed at said critical angle formed with a plane normal to the other of said faces to reconvert said last mentioned beam of waves to a beam of longitudinal waves; and an output detector of longitudinal waves in the path of said reconverted longitudinal waves, said generator and detector being respectively attached to said first and second mode converting surfaces with planes normal thereto forming equal predetermined angles with respect to planes normal to said first and second mode converting surfaces, said first mode converting surface and input generator attached thereto and said second mode converting surface and output detector attached thereto being disposed in mutually inverse relation on opposite sides of said working plane so as to maintain equality of the path lengths of all rays of the aforementioned beams beginning at said generator and terminating at said detector.

2. In combination a solid acoustic delay line of a folded path type comprising a slab of a solid elastic material having substantially flat and parallel major faces; an input generator of a beam of longitudinal acoustic waves; a first mode converting surface disposed at a predetermined angle formed with a plane normal to one of said major faces to convert said beam of longitudinal waves into a beam of shear waves polarized perpendicular to and propagated in a direction parallel to said major faces; a plurality of reflecting surfaces included in said slab and disposed normally to said major faces and parallel to the direction of polarization of said beam of shear waves; a second mode converting surface disposed at said predetermined angle formed with a plane normal to the other of said major faces to reconvert said shear wave beam to a beam of longitudinal waves whereby each ray of said shear waves in passing through said slab from said first mode converting surface to said second mode converting surface is constrained to follow a path of multiple reflections without mode conversion in working planes parallel to and located between said major faces; and an output detector of longitudinal waves disposed to intercept said last-mentioned reconverted longitudinal waves, said generator and detector being attached to said first and second mode converting surfaces respectively at equally critical angles formed effectively between said first mode converting surface and input generator and said second mode converting surface and output detector respectively, said critical angles being different from said predetermined angles, said first mode converting surface and input generator and said second mode converting surface and output detector being disposed in mutually inverse relationship on opposite sides of a major plane symmetrically located between said two parallel surfaces, said predeterminedly and critically angular disposition of said first and second mode converting surfaces, input generator and output detector being necessary to inject energy of said shear wave beam into said slab and to extract said last-mentioned energy therefrom without energy dissipating mode conversions, while maintaining equality of the path lengths of all rays of the aforementioned beams beginning at said generator and terminating at said detector.

3. In combination, a solid acoustic delay device of a folded path type comprising a slap of solid elastic material having substantially flat and parallel major faces; an input generator of a beam of longitudinal mode acoustic waves; a first mode converting surface having said generator attached thereto and disposed at a first critical angle formed between said beam and a plane normal to said surface; said surface being further disposed at a second critical angle formed with a plane normal to one of said major faces; a plurality of reflecting faces formed integrally with said slab and disposed in perpendicular relation to said major faces; said first mode converting surface being substituted for one of said reflecting surfaces; a second mode converting surface disposed at said first critical angle formed between another beam of longitudinal waves and a plane normal to said last-mentioned surface; said second surface being further disposed at said second critical angle formed with a plane normal to another of said major faces; said second mode converting surface being substituted for another said reflecting surfaces; and an output detector of longitudinal waves attached to said second mode converting surface; said first surface and generator and said second surface and detector being mutually inversely disposed on opposite sides of a major plane symmetrically located between said parallel surfaces; said generator, detector, first and second mode converting surfaces and reflecting faces cooperating so each ray of longitudinal mode waves originating at said generator and impinging upon said first mode converting surface is completely transformed into a ray of shear mode waves propagated in said slab in a direction parallel to a working plane intermediate and parallel to said major faces, undergoes a plurality of nonmode converting reflections propagated in directions parallel to said working plane by said reflecting faces, impinges upon said second mode converting surface, and is reconverted by said last-mentioned surface to a ray of longitudinal mode waves, and each ray of said last-mentioned longitudinal mode waves impinges upon said detector, whereby the paths of all such rays of said longitudinal and shear mode waves between said generator and detector are made equal and all reflections from said reflecting faces are accomplished without conversion into spurious mode waves having such opposing phase relations as tend to cancel and thereby dissipate acoustic energy in said slab.

4. An ultrasonic delay system comprising a solid delay device including two coextensive surfaces disposed in spaced parallel relation and connected by a plurality of perpendicular facets for transmitting a beam of ultrasonic radiations between two terminal facets with a multiplicity of reflection paths, and a pair of mode converting elements formed integrally with said device to constitute said terminal facets between which at least one other facet intervenes, each of said pair of elements comprising two flat surfaces mutually angularly extending from said two parallel surfaces to form a wedge, a first one of said elements constituting a transmitting wedge facet to convert a beam of ultrasonic radiations vibrating in a longitudinal mode and impinging on one of said wedge surfaces at a predetermined angle of incidence with a plane normal thereto into a beam of ultrasonic radiations of shear mode vibrations reflected from said last-mentioned wedge surface at a different predetermined angle with said last-mentioned plane, said shear mode vibrations being propagated in said device in a direction parallel to a major plane located symmetrically between and parallel to said two parallel surfaces, a second one of said mode converting elements constituting a receiving wedge facet to reconvert into longitudinal mode vibrations said shear mode vibrations impinging on one of said wedge surfaces of said second element corresponding to said one wedge surface of said one element, said shear mode waves impinging on said one wedge surface of said second element at said different predetermined angle and reflected from said last-mentioned surface at said first-mentioned predetermined angle whereby said shear mode vibrations are reconverted into longitudinal mode vibrations, and a pair of longitudinal mode transducing elements respectively mounted on the other wedge surfaces of said mode converting elements, said transmitting and receiving wedge facets being disposed in mutually inverse symmetry on opposite sides of said major plane, said reflection paths in said device and elements being equalized to provide said device with a substantially flat loss versus frequency characteristic over a preselected frequency range of said vibrations.

5. A fused quartz delay device having two substantially coextensive major surfaces spaced in parallel relation and terminated in a plurality of integral facets normal to said surfaces for transmitting a beam of acoustic vibrations in a plurality of reflection paths between two terminals constituted by two of said facets and having at least one other facet lying between said last-mentioned two facets, a pair of electroacoustic transducing elements for respectively transmitting and receiving a beam of acoustic energy vibrating in a longitudinal mode, and two mode converting elements one of which constitutes one of said two terminal facets and supports said transmitting transducing element to convert longitudinal mode vibrations into shear mode vibrations for transmission in said device, the other of said elements constituting the second of said two terminal facets and supporting said receiving transducing element to reconvert the shear mode vibrations received from said device into longitudinal mode vibrations, each of said two mode converting elements being formed integrally with said device to constitute one of said two terminal facets thereof, each of said last-mentioned elements including a flat beveled edge surface forming an angle of substantially twenty-seven degrees and twenty-seven minutes with a plane normal to one of said two major surfaces and a lip-surface tilted inwardly from the outer periphery of said beveled edge surface toward the other of said two major surfaces and forming an angle of substantially forty-six degrees and forty-two minutes with said last-mentioned surface, said pair of electroacoustic transducing elements being attached to the lip-surfaces of their respective mode converting elements, said one mode converting element supporting said transmitting transducing element thereon and said other mode converting element supporting said receiving transducing element thereon being mutually inversely disposed on opposite sides of a major plane positioned symmetrically between and parallel to said two major surfaces, whereby the acoustic vibrations transmitted in said device and mode converting elements are caused to traverse equal pathlengths between said transmitting and receiving transducing elements for providing said device with a substantially flat loss versus frequency characteristic over a preselected frequency range of said last-mentioned vibrations.

6. An ultrasonic delay line comprising a solid delay device having two spaced and coextensive parallel surfaces terminating in a plurality of facets normal thereto to transmit a beam of ultrasonic radiations with a multiplicity of reflection paths, and two mode converting elements joined integrally to said device and substituted for two of said facets, each of said two elements comprising at least one reflecting surface forming a predetermined angle with a plane normal to one of said two parallel surfaces, a pair of electroacoustic transducing elements being attached to respective mode converting elements with the planes normal thereto forming equal critical angles with respect to planes normal to the reflecting surfaces of the respective mode converting elements, said one reflecting surfaces being mutually inversely joined to respectively different ones of said two parallel surfaces for equalizing the reflection paths of the ultrasonic radiations in said device and two elements thereby tending to provide said device with a substantially flat loss versus frequency characteristic over a preselected frequency range of said last-mentioned ultrasonic radiations.

7. The delay line according to claim 6 in which said one reflecting surfaces of said two elements form substantially identical predetermined angles with the planes normal to said respectively different ones of said two parallel surfaces.

8. The delay line according to claim 6 in which each of said mode converting elements comprises a second reflecting surface, said one and second reflecting surfaces of each of said mode converting elements being mutually angularly disposed to intersect at corresponding ends and to have opposite ends joined integrally to said parallel surfaces, one of said two mode converting elements having said one reflecting surface joined to one of said two parallel surfaces and said second reflecting surface joined to the other of said two parallel surfaces, the other of said two mode converting elements having said one reflecting surface joined to said other parallel surface and said second reflecting surface joined to said one parallel surface, said one reflecting surfaces of said one and other mode converting elements forming said predetermined angles with planes normal to said one and other parallel surfaces respectively, said one and second reflecting surfaces of said mode converting elements forming said critical angles therebetween at said intersecting corresponding ends thereof, and said pair of electroacoustic transducing elements being respectively mounted on said second reflecting surfaces.

9. The delay line according to claim 8 in which said one and second reflecting surfaces of said two mode converting elements have their intersecting ends mutually inversely disposed on opposite sides of a plane located symmetrically between said two parallel surfaces and intersecting said two mode converting elements.

10. The delay line according to claim 9 in which said one and second reflecting surfaces of said one and other mode converting elements respectively intersect at corresponding ends and form therebetween said critical angles which are larger than said predetermined angles.

11. An acoustic delay line comprising a solid dielectric having two spaced and coextensive major parallel surfaces terminating in a plurality of facets normal thereto for transmitting a beam of ultrasonic radiations vibrating in a mode with a plurality of reflections caused by said facets, and two mode converting elements joined integrally to said dielectric and substituted for two of said facets, said two elements being spaced from one another in such manner that at least one of said facets lies therebetween, each of said two elements comprising first and second reflecting surfaces mutually angularly disposed to intersect at corresponding ends at certain identical angles and to diverge at opposite ends which are joined to said two parallel surfaces, corresponding first reflecting surfaces of said two elements forming other identical angles with planes normal to respectively different ones of said two parallel surfaces, a pair of electroacoustic transducers respectively attached to the second reflecting surfaces of said mode converting elements, said first and second reflecting surfaces of said two elements having their intersecting ends mutually inversely disposed on opposite sides of a plane located symmetrically between said two parallel surfaces and intersecting said two elements, said reflection paths of the ultrasonic radiations in said dielectric and elements being thus equalized in length for providing said dielectric with a substantially flat loss versus frequency characteristic over a preselected frequency range of said last-mentioned radiations.

References Cited in the file of this patent

UNITED STATES PATENTS

| | | |
|---|---|---|
| 2,592,135 | Firestone | Apr. 8, 1952 |
| 2,624,804 | Arenberg | Jan. 6, 1953 |
| 2,703,867 | Arenberg | Mar. 8, 1955 |
| 2,712,638 | Arenberg | July 5, 1955 |
| 2,777,997 | Arenberg | Jan. 15, 1957 |
| 2,839,731 | McSkimin | June 17, 1958 |
| 2,886,787 | Broadhead et al. | May 12, 1959 |

FOREIGN PATENTS

| | | |
|---|---|---|
| 470,583 | Canada | Jan. 2, 1951 |